United States Patent
Hua

(10) Patent No.: US 12,244,237 B2
(45) Date of Patent: Mar. 4, 2025

(54) ETHERNET DEVICE, AND BIDIRECTIONAL CONVERTER AND CONTROL METHOD

(71) Applicant: SUZHOU METABRAIN INTELLIGENT TECHNOLOGY CO., LTD., Jiangsu (CN)

(72) Inventor: Deyang Hua, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,055

(22) PCT Filed: Jun. 28, 2022

(86) PCT No.: PCT/CN2022/102082
§ 371 (c)(1),
(2) Date: Jun. 25, 2024

(87) PCT Pub. No.: WO2023/206786
PCT Pub. Date: Nov. 2, 2023

(65) Prior Publication Data
US 2024/0421716 A1 Dec. 19, 2024

(30) Foreign Application Priority Data
Apr. 28, 2022 (CN) .......................... 202210461471.7

(51) Int. Cl.
H02M 3/335 (2006.01)
H04L 12/10 (2006.01)

(52) U.S. Cl.
CPC ........ H02M 3/33584 (2013.01); H04L 12/10 (2013.01)

(58) Field of Classification Search
CPC .................. H02M 3/33584; H04L 12/10
See application file for complete search history.

(56) References Cited

U.S. PATENT DOCUMENTS

| | | | | |
|---|---|---|---|---|
| 4,318,166 A | * | 3/1982 | Bloom | H02M 3/3372 363/26 |
| 5,539,630 A | * | 7/1996 | Pietkiewicz | H02M 3/3372 363/17 |

(Continued)

FOREIGN PATENT DOCUMENTS

| CN | 1545195 A | 11/2004 |
|---|---|---|
| CN | 105811778 A | 7/2016 |

(Continued)

OTHER PUBLICATIONS

Cai. Kejian et al. "A Wide Range Voltage 1-10 Type DC/AC Inverter", Transactions of China Electrotechnical Society, vol. 23. No. 3: 60-65, English Abstract (2008).

(Continued)

Primary Examiner — Yusef A Ahmed
(74) Attorney, Agent, or Firm — Merchant & Gould P.C.

(57) ABSTRACT

Disclosed are an Ethernet device, and a bidirectional converter and a control method. The bidirectional converter is arranged in any Ethernet device, including: a first switch transistor, a second switch transistor, a third switch transistor, a fourth switch transistor, a first transformer, and a controller. The controller is configured to: enable the bidirectional converter to be in a forward mode or a flyback mode by controlling respective on/off states of the first switch transistor, the second switch transistor, the third switch transistor and the fourth switch transistor. The bidirectional converter is configured to: in response to being in the forward mode, receive power supplied from a network port and transmit electric energy to a load bus, or in response to being in the flyback mode, receive power supplied from the load bus and transmit electric energy to the network port.

17 Claims, 2 Drawing Sheets

(56) References Cited

U.S. PATENT DOCUMENTS

| | | | |
|---|---|---|---|
| 5,903,448 A | 5/1999 | Davila, Jr. | |
| 8,456,865 B1* | 6/2013 | Bianchi | H02M 7/53873 |
| | | | 363/21.05 |
| 8,456,867 B1* | 6/2013 | Karlsson | H02M 1/36 |
| | | | 323/901 |
| 10,218,278 B2* | 2/2019 | Tschirhart | H02M 3/156 |
| 10,554,138 B2* | 2/2020 | Tschirhart | H02M 3/33592 |
| 11,283,360 B2* | 3/2022 | Jin | H02M 3/3155 |
| 11,575,328 B2* | 2/2023 | Malone | H05B 45/39 |
| 2008/0259664 A1* | 10/2008 | Su | H05K 7/20445 |
| | | | 363/125 |
| 2009/0244934 A1* | 10/2009 | Wang | H02M 3/3378 |
| | | | 363/21.06 |
| 2010/0054008 A1* | 3/2010 | Schaible | H02M 3/33592 |
| | | | 363/127 |
| 2011/0164438 A1* | 7/2011 | Appelberg | H02M 3/33592 |
| | | | 363/21.1 |
| 2011/0205764 A1* | 8/2011 | Sheng | H02M 3/33592 |
| | | | 363/20 |
| 2013/0128624 A1* | 5/2013 | Tamura | H02M 1/10 |
| | | | 363/21.01 |
| 2013/0155727 A1* | 6/2013 | Karlsson | H02M 3/156 |
| | | | 363/21.04 |
| 2013/0163287 A1* | 6/2013 | Pal | H02M 3/33515 |
| | | | 363/16 |
| 2016/0190934 A1* | 6/2016 | Hung | H02M 3/33576 |
| | | | 363/21.01 |
| 2017/0353116 A1* | 12/2017 | Zhang | H02M 3/33571 |
| 2018/0040410 A1* | 2/2018 | Hamada | H05K 1/0262 |
| 2018/0145595 A1* | 5/2018 | Fontana | H02M 1/12 |
| 2018/0287504 A1* | 10/2018 | Parsekar | H02M 3/335 |
| 2019/0252990 A1* | 8/2019 | Seok | H02M 3/33592 |
| 2021/0191892 A1* | 6/2021 | Yu | H02J 3/0073 |
| 2021/0265838 A1* | 8/2021 | White | H02J 1/14 |
| 2023/0361582 A1* | 11/2023 | Fan | H01M 10/4264 |
| 2023/0387815 A1* | 11/2023 | Wu | H02M 3/01 |

FOREIGN PATENT DOCUMENTS

| | | |
|---|---|---|
| CN | 105896991 A | 8/2016 |
| CN | 106026678 A | 10/2016 |
| CN | 112968607 A | 6/2021 |
| CN | 114629346 A | 6/2022 |
| JP | 2003-134825 A | 5/2003 |

OTHER PUBLICATIONS

International Search Report and Written Opinion for PCT/CN2022/102082 (Jan. 3, 2023).

Search Report received for Chinese Patent Application No. 2022104614717.

* cited by examiner

__(2,344,237 B2)__

ETHERNET DEVICE, AND BIDIRECTIONAL CONVERTER AND CONTROL METHOD

CROSS-REFERENCE TO RELATED APPLICATION

The present disclosure is a national stage filing under 35 U.S.C. § 371 of international application number PCT/CN2022/102082, filed Jun. 28, 2022, which claims priority to Chinese patent application No. CN 202210461471.7, filed to the China National Intellectual Property Administration on Apr. 28, 2022 and entitled "Ethernet Device, and Bidirectional Converter and Control Method", which is incorporated herein by reference in its entirety.

TECHNICAL FIELD

The present disclosure relates to the technical field of circuits, and in particular, to an Ethernet device, and a bidirectional converter and a control method.

BACKGROUND

PoE (Power over Ethernet) includes two parts: a PSE (Power Sourcing Equipment) and a PD (Powered Device). The PSE can supply power to the PD, and is also a manager of the whole PoE (Power over Ethernet) process. The PD is a load receiving power supplied from the PSE, for example, Ethernet devices such as an IP phone, a network security camera, and a palmtop computer, etc. The PSE and the PD establish, on the basis of the IEEE 802.3 standard, an information association in aspects such as connection status, device type and power consumption level, etc. of the powered device, and on this basis, the PSE provides power to the PD over Ethernet.

A standard Category-5 cable consists of four pairs of twisted wires, and the IEEE 802.3af standard allows for two wire-sequence power supply methods, as shown in FIG. 1. One power supply method is to transmit a current on wire pairs 4, 5, 7 and 8, wherein it is stipulated that 4 and 5 are positive electrodes, and 7 and 8 are negative electrodes. Another power supply method is to transmit a current on wire pairs 1, 2, 3 and 6, and polarities are arbitrary, that is, 1 and 2 are positive electrodes, 3 and 6 are negative electrodes, or 1 and 2 are negative electrodes, and 3 and 6 are positive electrodes. Therefore, although the PSE provides a direct current, there are still uncertainty of choosing between two power supply lines and uncertainty of power supply polarities, that is, 4, 5, 7 and 8 may supply power, 1, 2, 3 and 6 may supply power, and also 1, 2, 3, 6 and 4, 5, 7, 8 may supply power at the same time. When 1, 2, 3 and 6 are used for power supply, positive electrodes and negative electrodes are uncertain.

Therefore, in conventional solutions, it is necessary to use a rectifier circuit to determine a power supply direction. In FIG. 1, the PSE is connected to the PD via a Cat-5 cable, and the PSE also supplies power to the PD via the cable. As described above, because positive and negative electrodes of 1, 2, 3 and 6 are uncertain, the PD in FIG. 1 needs to be rectified by using a rectifier bridge. As a rectifier bridge needs to be additionally provided to rectify the current, the system space and cost are increased.

In addition, in a current PoE system, the PSE serving as a power supply party supplies power to the PD serving as a powered party, such that the PSE cannot be switched for use as the PD, and also the PD cannot be switched for use as the PSE, resulting in very low flexibility.

SUMMARY

Embodiments of the present disclosure disclose a bidirectional converter, wherein the bidirectional converter is arranged in any Ethernet device, including:
  a first switch transistor, having a first end connected to a first wiring terminal of a network port, and a second end connected to a first end of a primary winding of a first transformer;
  a second switch transistor, having a first end connected to a second wiring terminal of the network port, and a second end connected to a second end of the primary winding of the first transformer;
  the first transformer; wherein secondary windings of the first transformer include a first secondary winding and a second secondary winding, a second end of the first secondary winding is connected to a first end of the second secondary winding, and a connection end there between is connected to a positive electrode of a load bus; and the first end of the primary winding of the first transformer, a first end of the first secondary winding and the first end of the second secondary winding are dotted terminals of each other;
  a third switch transistor, having a first end connected to the first end of the first secondary winding, and a second end respectively connected to a second end of a fourth switch transistor and a negative electrode of the load bus;
  the fourth switch transistor, having a first end connected to a second end of the second secondary winding; and
  a controller; wherein control ends of the first switch transistor, the second switch transistor, the third switch transistor and the fourth switch transistor are all connected to the controller, and the controller is configured to: enable the bidirectional converter to be in a forward mode or a flyback mode by controlling respective on/off states of the first switch transistor, the second switch transistor, the third switch transistor and the fourth switch transistor.
  the bidirectional converter is configured to: in response to being in the forward mode, receive power supplied from the network port and transmit electric energy to the load bus, or in response to being in the flyback mode, receive power supplied from the load bus and transmit electric energy to the network port; wherein in the forward mode, any one of the first wiring terminal of the network port and the second wiring terminal of the network port is used as a positive electrode power supply end, and the voltage of the positive electrode of the load bus is higher than the voltage of the negative electrode of the load bus.

In some embodiments, the controller is configured to:
  in response to controlling the bidirectional converter to be in the flyback mode, control the bidirectional converter to periodically switch between a preset first state and a preset second state, or control the bidirectional converter to periodically switch between a preset third state and the second state; or
  in response to controlling the bidirectional converter to be in the forward mode and in response to the voltage of the first wiring end of the network port being higher than the voltage of the second wiring end of the network port, control the bidirectional converter to periodically switch between a preset fourth state and a preset fifth state; or in response to the voltage of the second wiring terminal of the network port being higher than the voltage of the first wiring terminal of the network port, control the bidirectional converter to periodically switch between a preset sixth state and a seventh state;

wherein the first state is: the third switch transistor and the first switch transistor are in a turned-off state, and the fourth switch transistor and the second switch transistor are in a turned-on state; the second state is: the third switch transistor and the fourth switch transistor are in a turned-off state, and the first switch transistor and the second switch transistor are in a turned-on state; the third state is: the third switch transistor and the first switch transistor are in a turned-on state, and the fourth switch transistor and the second switch transistor are in a turned-off state;

the fourth state is: the first switch transistor, the second switch transistor and the fourth switch transistor are in a turned-on state, and the third switch transistor is a turned-off state;

the fifth state is: the first switch transistor and the third switch transistor are in a turned-on state, and the second switch transistor and the fourth switch transistor are in a turned-off state;

the sixth state is: the first switch transistor, the second switch transistor, and the third switch transistor are in a turned-on state, and the fourth switch transistor is in a turned-off state; and the seventh state is: the second switch transistor and the fourth switch transistor are in a turned-on state, and the first switch transistor and the third switch transistor are in a turned-off state.

In some embodiments, the bidirectional converter further includes:

a first capacitor, having a first end connected to the first wiring end of the network port, and a second end connected to the second wiring end of the network port; and a second capacitor, having a first end connected to the positive electrode of the load bus, and a second end connected to the negative electrode of the load bus.

In some embodiments, the network port is an RJ45 network port.

In some embodiments, the first secondary winding and the second secondary winding of the first transformer have the same number of turns.

In some embodiments, the bidirectional converter further includes a display apparatus; the controller is further configured to:

control the display apparatus to display first prompt information in response to controlling the bidirectional converter to be in the forward mode; or control the display apparatus to display second prompt information in response to controlling the bidirectional converter to be in the flyback mode.

In some embodiments, the bidirectional converter further includes:

a first diode, having an anode connected to the first end of the first switch transistor, and a cathode connected to the second end of the first switch transistor;

a second diode, having an anode connected to the first end of the second switch transistor, and a cathode connected to the second end of the second switch transistor;

a third diode, having an anode connected to the second end of the third switch transistor, and a cathode connected to the first end of the third switch transistor; and a fourth diode, having an anode connected to the second end of the fourth switch transistor, and a cathode connected to the first end of the fourth switch transistor.

In some embodiments, the first switch transistor, the second switch transistor, the third switch transistor and the fourth switch transistor are all switch transistors provided with body diodes;

the anode of the body diode of the first switch transistor is connected to the first end of the first switch transistor; the anode of the body diode of the second switch transistor is connected to the first end of the second switch transistor; the anode of the body diode of the third switch transistor is connected to the second end of the third switch transistor; and the anode of the body diode of the fourth switch transistor is connected to the second end of the fourth switch transistor.

Embodiments of the present disclosure further disclose a control method for a bidirectional converter, which is applied to the controller in the bidirectional converter in any one of the preceding embodiments; the control method for a bidirectional converter includes:

enabling the bidirectional converter to be a forward mode or a flyback mode by controlling respective on/off states of the first switch transistor, the second switch transistor, the third switch transistor and the fourth switch transistor;

wherein in response to the bidirectional converter being in the forward mode, the bidirectional converter receives power supplied from the network port and transmits electric energy to the load bus, any one of the first wiring terminal of the network port and the second wiring terminal of the network port is used as a positive electrode power supply end, and the voltage of the positive electrode of the load bus is higher than the voltage of the negative electrode of the load bus; or in response to the bidirectional converter being in the flyback mode, the bidirectional converter receives power supplied from the load bus and transmits electric energy to the network port.

Embodiments of the present disclosure further disclose an Ethernet device, including the bidirectional converter in any one of the preceding embodiments.

BRIEF DESCRIPTION OF THE DRAWINGS

In order to describe the technical solutions in the embodiments of the present disclosure or in the related art more clearly, hereinafter, accompanying drawings requiring to be used in the embodiments or the related art will be introduced briefly. Apparently, the accompanying drawings in the following description merely relate to some embodiments of the present disclosure, and for a person of ordinary skill in the art, other accompanying drawings can also be obtained according to these accompanying drawings without involving any inventive effort.

DETAILED DESCRIPTION OF THE EMBODIMENTS

Some embodiments of the present disclosure provide a bidirectional converter, which can enable an Ethernet device to be used not only as a PSE but also as a PD, thereby improving the use flexibility of the Ethernet device. In addition, the solutions in some embodiments of the present disclosure facilitate reduction of system space and cost.

To make a person skilled in the art better understand the solutions of some embodiments of the present disclosure, hereinafter, some embodiments of the present disclosure are further described in detail with reference to the accompanying drawings and the specific embodiments. It is apparent that the embodiments described are not all embodiments but a part of embodiments of the present disclosure. All other embodiments obtained by a person of ordinary skill in the art on the basis of the embodiments of the present disclosure without any inventive effort shall all fall within the scope of protection of the present disclosure.

Figure 2:
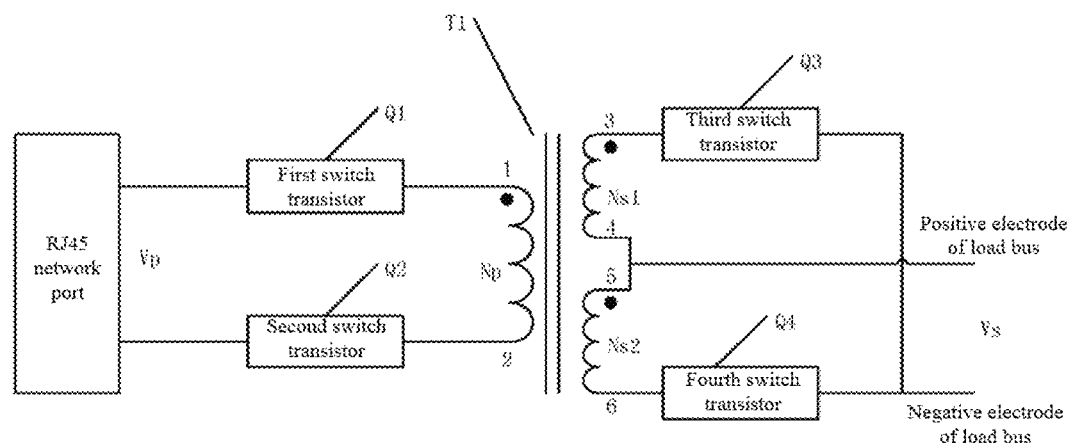
FIG. 2 is a first schematic structural diagram of a bidirectional converter according to one or more embodiments.

Please refer to FIG. 2, FIG. 2 is a schematic structural diagram of a bidirectional converter according to one or more embodiments. The bidirectional converter is arranged in any Ethernet device, and the bidirectional converter may include:
- a first switch transistor Q1, having a first end connected to a first wiring terminal of a network port, and a second end connected to a first end of a primary winding of a first transformer T1;
- a second switch transistor Q2, having a first end connected to a second wiring terminal of the network port, and a second end connected to a second end of the primary winding of the first transformer T1;
- a first transformer T1; wherein secondary windings of the first transformer T1 include a first secondary winding and a second secondary winding, a second end of the first secondary winding is connected to a first end of the second secondary winding, and a connection end there between is connected to a positive electrode of a load bus; and the first end of the primary winding of the first transformer T1, a first end of the first secondary winding and the first end of the second secondary winding are dotted terminals of each other;
- a third switch transistor Q3, having a first end connected to the first end of the first secondary winding, and a second end respectively connected to a second end of a fourth switch transistor Q4 and a negative electrode of the load bus;
- the fourth switch transistor Q4, having a first end connected to a second end of the second secondary winding; and
- a controller.

Control ends of the first switch transistor Q1, the second switch transistor Q2, the third switch transistor Q3, and the fourth switch transistor Q4 are all connected to the controller.

The controller is configured to: enable the bidirectional converter to be in a forward mode or a flyback mode by controlling respective on/off states of the first switch transistor Q1, the second switch transistor Q2, the third switch transistor Q3 and the fourth switch transistor Q4.

When the bidirectional converter is in the forward mode, the bidirectional converter receives power supplied from the network port and transmits electric energy to the load bus; when the bidirectional converter is in the flyback mode, the bidirectional converter receives power supplied from the load bus and transmits electric energy to the network port; and when the bidirectional converter is in the forward mode and any one of the first wiring terminal of the network port and the second wiring terminal of the network port is used as a positive electrode power supply end, the voltage of the positive electrode of the load bus is higher than the voltage of the negative electrode of the load bus.

In some embodiments, the bidirectional converter is configured to: in response to being in the forward mode, receive power supplied from the network port and transmit electric energy to the load bus, or in response to being in the flyback mode, receive power supplied from the load bus and transmit electric energy to the network port. In the forward mode, any one of the first wiring terminal of the network port and the second wiring terminal of the network port is used as a positive electrode power supply end, and the voltage of the positive electrode of the load bus is higher than the voltage of the negative electrode of the load bus.

In FIG. 2, the network port is specifically an RJ45 network port, which is a common embodiment in practical applications; and in other embodiments, other types of network ports may be set according to requirements.

Figure 1:
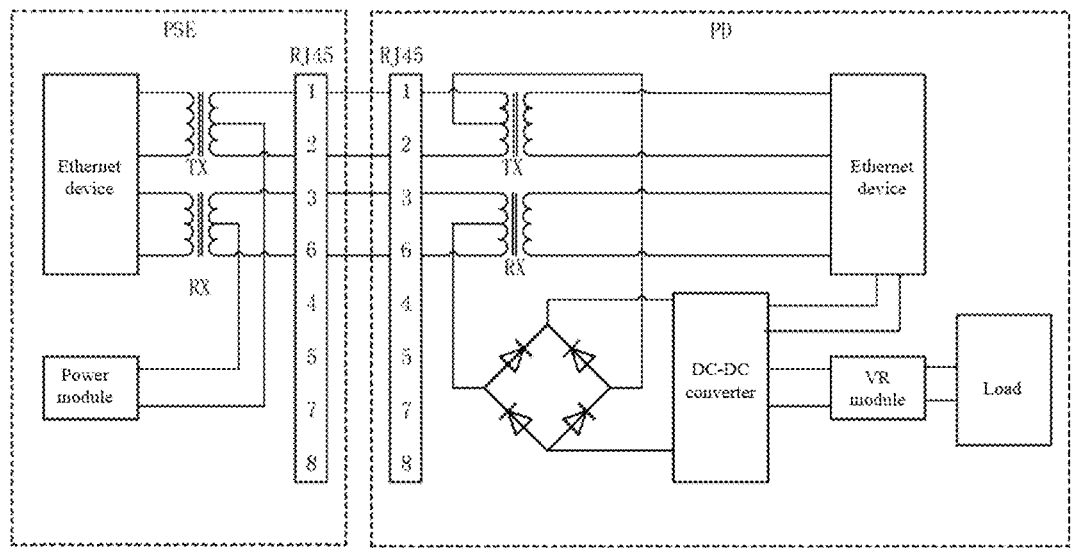
FIG. 1 is a schematic structural diagram of conventional PoE.

As described above, a standard Category-5 cable consists of four pairs of twisted wires, and the IEEE 802.3af (a protocol standard of a Power over Ethernet technology) allows for two wire-sequence power supply methods. That is, one power supply method is to transmit a current on a wire pair 4, a wire pair 5, a wire pair 7 and a wire pair 8 in FIG. 1, and it is stipulated that the wire pair 4 and the wire pair 5 are positive electrodes, and the wire pair 7 and the wire pair 8 are negative electrodes. Another power supply method is to transmit a current on a wire pair 1, a wire pair 2, a wire pair 3 and a wire pair 6 in FIG. 1, and polarities are arbitrary, that is, the wire pair 1 and the wire pair 2 are positive electrodes, the wire pair 3 and the wire pair 6 are negative electrodes, or the wire pair 1 and the wire pair 2 are negative electrodes, and the wire pair 3 and the wire pair 6 are positive electrodes.

Therefore, when the network port is specifically an RJ45 network port, the first wiring terminal of the network port described in the solutions of embodiments of the present disclosure may be the wire pair 4 and the wire pair 5, and the second wiring terminal of the network port is the wire pair 7 and the wire pair 8; or the first wiring terminal of the network port is the wire pair 1 and the wire pair 2, and the second wiring terminal of the network port is the wire pair 3 and the wire pair 6; or the first wiring terminal of the network port is the wire pair 3 and the wire pair 6, and the second wiring terminal of the network port is the wire pair 1 and the wire pair 2. The configuration manners above do not affect implementation of embodiments of the present disclosure.

The controller can enable the bidirectional converter to be in the forward mode or the flyback mode by controlling respective on/off states of the first switch transistor Q1, the second switch transistor Q2, the third switch transistor Q3 and the fourth switch transistor Q4. The controller is not shown in FIGS. 2 and 3.

When the controller controls the bidirectional converter to be in the forward mode, the bidirectional converter can receive power supplied from the network port and transmit electric energy to the load bus; Correspondingly, when the bidirectional converter is in the flyback mode, the bidirectional converter receives power supplied from the load bus and transmits electric energy to the network port.

Furthermore, as described above, it can be determined that when a PD receives power supplied from a PSE, the power supply polarity is uncertain; that is, when the Ethernet device in embodiments of the present disclosure is used as the PD, and after connection to the PSE, the voltage of the first wiring terminal of the network port may be higher than the voltage of the second wiring terminal of the network port. That is to say, the first wiring terminal of the network port serves as a positive electrode power supply end. It is also possible that the voltage of the first wiring terminal of the network port is lower than the voltage of the second wiring terminal of the network port, that is, the second wiring terminal of the network port serves as the positive electrode power supply end.

Under the control of the controller in embodiments of the present disclosure, when the bidirectional converter is in the forward mode and any one of the first wiring terminal of the network port and the second wiring terminal of the network port is used as the positive electrode power supply end, the voltage outputted to the positive electrode of the load bus can be made to be higher than the voltage outputted to the negative electrode of the load bus, which is equivalent to that by controlling the bidirectional converter, the controller achieves the effect of determining a power supply direction by using a rectifier circuit in conventional solutions; however, the solutions in some embodiments of the present disclosure do not require an additional rectifier bridge for rectification as that in the conventional solutions, thereby facilitating reduction of system space and costs.

In addition, it should be noted that, for the bidirectional converter, the controller controls whether the bidirectional converter is in the forward mode or the flyback mode, which can be controlled according to actual needs. Generally, after devices in PoE perform handshake control, the controller in each bidirectional converter controls whether the corresponding bidirectional converter is in the forward mode or the flyback mode.

In addition, it should be noted that, after two bidirectional converters described in the embodiments of the present disclosure are provided in one Ethernet device, the Ethernet device may be used as both a PSE and a PD. That is, via one of the bidirectional converters, power supplied from another PSE is received at one network port; and via the other bidirectional converter, power is supplied to another PD from another network port.

In an embodiment of the present disclosure, when the controller controls the bidirectional converter to be in the flyback mode, the controller is configured to: control the bidirectional converter to periodically switch between a preset first state and a preset second state, or control the bidirectional converter to periodically switch between a preset third state and the second state. Specifically, the controller is configured to: in response to controlling the bidirectional converter to be in the flyback mode, control the bidirectional converter to periodically switch between the preset first state and the preset second state, or control the bidirectional converter to periodically switch between the preset third state and the second state.

The first state is: the third switch transistor Q3 and the first switch transistor Q1 are in a turned-off state, and the fourth switch transistor Q4 and the second switch transistor Q2 are in a turned-on state; the second state is: the third switch transistor Q3 and the fourth switch transistor Q4 are in a turned-off state, and the first switch transistor Q1 and the second switch transistor Q2 are in a turned-on state; and the third state is: the third switch transistor Q3 and the first switch transistor Q1 are in a turned-on state, and the fourth switch transistor Q4 and the second switch transistor Q2 are in a turned-off state.

When the controller controls the bidirectional converter to be in the forward mode, the controller is configured to: control the bidirectional converter to periodically switch between a preset fourth state and a preset fifth state when the voltage of the first wiring terminal of the network port is higher than the voltage of the second wiring terminal of the network port; and control the bidirectional converter to periodically switch between a preset sixth state and a seventh state when the voltage of the second wiring terminal of the network port is higher than the voltage of the first wiring terminal of the network port. Specifically, the controller is configured to: control the bidirectional converter to periodically switch between the preset fourth state and the preset fifth state in response to controlling the bidirectional converter to be in the forward mode and in response to the voltage of the first wiring end of the network port being higher than the voltage of the second wiring end of the network port; or control the bidirectional converter to periodically switch between the preset sixth state and the seventh state when the voltage of the second wiring terminal of the network port is higher than the voltage of the first wiring terminal of the network port.

The fourth state is: the first switch transistor Q1, the second switch transistor Q2 and the fourth switch transistor Q4 are in a turned-on state, and the third switch transistor Q3 is a turned-off state; the fifth state is: the first switch transistor Q1 and the third switch transistor Q3 are in a turned-on state, and the second switch transistor Q2 and the fourth switch transistor Q4 are in a turned-off state;

the sixth state is: the first switch transistor Q1, the second switch transistor Q2, and the third switch transistor Q3 are in a turned-on state, and the fourth switch transistor Q4 is in a turned-off state; and the seventh state is: the second switch transistor Q2 and the fourth switch transistor Q4 are in a turned-on state, and the first switch transistor Q1 and the third switch transistor Q3 are in a turned-off state.

Figure 3:
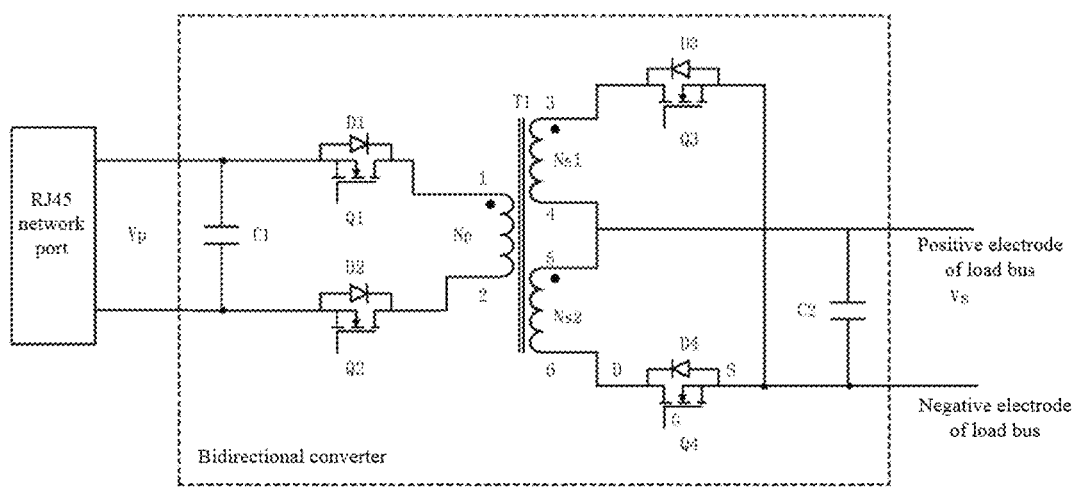
FIG. 3 is a second schematic structural diagram of a bidirectional converter according to one or more embodiments.

In an embodiment, the controller controlling, in the flyback mode, the bidirectional converter to periodically switch between the preset first state and the preset second state is taken as an example. In FIGS. 2 and 3, for ease of description, the primary winding of the first transformer T1 is denoted as Np, and the first end and the second end of the primary winding are denoted as 1 and 2 respectively; the first secondary winding and the second secondary winding of the first transformer T1 are denoted as Ns1 and Ns2 respectively, the first end and the second end of the first secondary winding are denoted as 3 and 4 respectively, and the first end and the second end of the second secondary winding are denoted as 5 and 6 respectively.

According to the illustration of the first state and the second state above, it can be determined that in both the first state and the second state, the third switch transistor Q3 keeps a turned-off state, and the second switch transistor Q2 keeps a turned-on state.

In the first state, the controller turns off the first switch transistor Q1 and turns on the fourth switch transistor Q4, and power is supplied by the positive electrode of the load bus; in this case, the first transformer T1 stores energy, and in the process in which the first transformer T1 stores energy, the voltage at the end 5 is higher than that at the end 6, and the voltage at the end 1 is higher than that at the end 2 in FIG. 2. After switching to the second state, the controller turns off the fourth switch transistor Q4, and turns on the first switch transistor Q1; in this case, the voltage at the end 6 is higher than that at the end 5, and the voltage at the end 2 is higher than that at the end 1 in FIG. 2. In the second state, both the first switch transistor Q1 and the second switch transistor Q2 are turned on, and therefore, the primary winding of the first transformer T1 releases energy, and generates a voltage Vp positive at the bottom and negative at the top and supplies same to the network port.

If in the flyback mode, the controller controls the bidirectional converter to periodically switch between the preset third state and the preset second state. In both the third state and the second state, the fourth switch transistor Q4 keeps a turned-off state, and the first switch transistor Q1 keeps a turned-on state.

In the third state, the controller turns off the second switch transistor Q2, and turns on the third switch transistor Q3, and power is supplied by the positive electrode of the load bus; in this case, the first transformer T1 stores energy, and in the process in which the first transformer T1 stores energy, the voltage at the end 4 is higher than that at the end 3, and the voltage at the end 2 is higher than that at the end 1 in FIG. 2. After switching to the second state, the controller turns off the third switch transistor Q3, and turns on the second switch transistor Q2; in this case, the voltage at the end 3 is higher than that at the end 4, and the voltage at the end 1 is higher than that at the end 2 in FIG. 2. In the second state, both the first switch transistor Q1 and the second switch transistor Q2 are turned on, and therefore, the primary winding of the first transformer T1 releases energy, and generates a voltage Vp positive at the top and negative at the bottom and supplies same to the network port.

The specific durations of the first state, the second state and the third state can all be set and adjusted according to actual needs; generally, the duration of the first state is equal to the duration of the second state, and the duration of the third state is equal to the duration of the second state.

When the controller controls the bidirectional converter to be in the forward mode, and the voltage of the first wiring end of the network port is higher than the voltage of the second wiring end of the network port, the controller controls the bidirectional converter to periodically switch between the preset fourth state and the preset fifth state.

According to the illustration of the fourth state and the fifth state above, it can be determined that in both the fourth state and the fifth state, the first switch transistor Q1 keeps a turned-on state.

In the fourth state, the controller turns on the second switch transistor Q2 and the fourth switch transistor Q4, and turns off the third switch transistor Q3. The voltage of the first wiring terminal of the network port is higher than the voltage of the second wiring terminal of the network port, and therefore, electric energy is transmitted to the load bus from Np to Ns2 through the first transformer T1. In this case, the voltage at the end 1 is higher than that at the end 2, and the voltage at the end 5 is higher than that at the end 6 in FIG. 2. Therefore, the voltage Vs of the load bus is positive at the top and negative at the bottom, that is, the voltage of the positive electrode of the load bus is higher than the voltage of the negative electrode of the load bus.

In the fifth state, the controller turns on the third switch transistor Q3, and turns off the second switch transistor Q2 and the fourth switch transistor Q4. After the second switch transistor Q2 is turned off, in FIG. 2, the voltage of the end 2 is higher than that of the end 1, the voltage of the end 6 is higher than that of the end 5 and higher than that of the end 3, the first secondary winding, the turned-on third switch transistor Q3 and a subsequent load form a loop, and energy is transmitted to the load bus through Ns1. In this case, the voltage Vs of the load bus is still positive at the top and negative at the bottom, that is, the voltage of the positive electrode of the load bus is higher than the voltage of the negative electrode of the load bus.

In an embodiment, when the controller controls the bidirectional converter to be in the forward mode, and the voltage of the second wiring end of the network port is higher than the voltage of the first wiring end of the network port, the controller controls the bidirectional converter to periodically switch between the preset sixth state and the preset seventh state.

According to the illustration of the sixth state and the seventh state above, it can be determined that in both the sixth state and the seventh state, the second switch transistor Q2 keeps a turned-on state.

In the sixth state, the controller turns on the first switch transistor Q1 and the third switch transistor Q3, and turns off the fourth switch transistor Q4. The voltage of the second wiring terminal of the network port is higher than the voltage of the first wiring terminal of the network port, and therefore, electric energy is transmitted to the load bus from Np to Ns1 through the first transformer T1. In this case, the voltage at the end 2 is higher than that at the end 1, and the voltage at the end 4 is higher than that at the end 3 in FIG. 2. Therefore, the voltage Vs of the load bus is positive at the top and negative at the bottom, that is, the voltage of the positive electrode of the load bus is higher than the voltage of the negative electrode of the load bus.

In the seventh state, the controller turns on the fourth switch transistor Q4, and turns off the first switch transistor Q1 and the third switch transistor Q3. After the first switch transistor Q1 is turned off, in FIG. 2, the voltage of the end 1 is higher than that of the end 2, the voltage of the end 3 is higher than that of the end 5 and higher than that of the end 6, the second secondary winding, the turned-on fourth switch transistor Q4 and a subsequent load form a loop, and energy is transmitted to the load bus through Ns2. In this case, the voltage Vs of the load bus is still positive at the top and negative at the bottom, that is, the voltage of the positive electrode of the load bus is higher than the voltage of the negative electrode of the load bus.

In an embodiment, the specific durations of the fourth state, the fifth state, the sixth state and the seventh state all can be set and adjusted according to actual needs; however, generally, the duration of the fourth state is equal to the duration of the fifth state, and the duration of the sixth state is equal to the duration of the seventh state.

It can be determined that no matter whether the voltage of the first wiring terminal of the network port is higher than the voltage of the second wiring terminal of the network port, or the voltage of the second wiring terminal of the network port is higher than the voltage of the first wiring terminal of the network port, both of which can enable the voltage of the load bus to be positive at the top and negative at the bottom under the control of the controller, i.e. Vs voltage having a fixed direction in a secondary side of the first transformer T1 in the forward mode, thereby achieving the purpose of fixed output in the case of non-polarity input, and solving the problem that the direction in which a PSE supplies power to a PD in PoE is uncertain; furthermore, it is unnecessary to arrange a full-bridge rectifier circuit as that in conventional solutions, thereby facilitating reduction of system space and cost.

In an embodiment of the present disclosure, reference can be made to FIG. 3, the bidirectional converter further includes:

a first capacitor C1, having a first end connected to the first wiring end of the network port, and a second end connected to the second wiring end of the network port; and a second capacitor C2, having a first end connected to the positive electrode of the load bus, and second end connected to the negative electrode of the load bus.

Since the solutions of some embodiments of the present disclosure need to use the first transformer T1 for charging and discharging, in such embodiments, capacitors are arranged at both the network port and the load bus, so as to improve the stability of the voltage. Furthermore, it can be determined from the illustration above that, in embodiments of the present disclosure, the voltage of the positive electrode of the load bus is always higher than the voltage of the negative electrode of the load bus, and therefore the second capacitor C2 may be selected as a non-polar capacitor, and may also be selected as a polar capacitor, which both do not affect the implementation of embodiments of the present disclosure.

However, both the first wiring terminal of the network port and the second wiring terminal of the network port may serve as the positive electrode power supply end, that is, the voltage of the first wiring terminal of the network port may be higher than and may also be lower than the voltage of the second wiring terminal of the network port, and therefore the first capacitor C1 needs to be selected as a non-polar capacitor.

According to the solutions in embodiments of the present disclosure, the secondary windings of the first transformer T1 include the first secondary winding and the second secondary winding, and the first secondary winding and the second secondary winding of the first transformer T1 are generally set to have the same number of turns, such that magnetic bias situation of the first transformer T1 can be effectively avoided, which also facilitates ensuring the stability of voltage outputted by the bidirectional converter.

In an embodiment of the present disclosure, the bidirectional converter further includes a display apparatus. The controller is further configured to: control the display apparatus to display first prompt information when the bidirectional converter is controlled to be in a forward mode; and control the display apparatus to display second prompt information when the bidirectional converter is controlled to be in a flyback mode. Specifically, the controller is further configured to: control the display apparatus to display the first prompt information in response to controlling the bidirectional converter to be in the forward mode; or control the display apparatus to display the second prompt information in response to controlling the bidirectional converter to be in the flyback mode.

The bidirectional converter in some embodiments of the present disclosure can be in the forward mode, such that an Ethernet device provided with the bidirectional converter is used as a PD, and also the bidirectional converter can be in the flyback mode, such that an Ethernet device provided with the bidirectional converter is used as a PSE; therefore, in such embodiments, the first prompt information or the second prompt information is displayed by the display apparatus, allowing a worker to conveniently determine the current mode of the bidirectional converter. The display apparatus may be devices such as a simple indicator light, and may also be devices such as a display screen, which can be selected according to actual requirements.

In an embodiment of the present disclosure, the bidirectional converter further includes:
- a first diode D1, having an anode connected to the first end of the first switch transistor Q1, and a cathode connected to the second end of the first switch transistor Q1;
- a second diode D2, having an anode connected to the first end of the second switch transistor Q2, and a cathode connected to the second end of the second switch transistor Q2;
- a third diode D3, having an anode connected to the second end of the third switch transistor Q3, and a cathode connected to the first end of the third switch transistor Q3; and
- a fourth diode D4, having an anode connected to the second end of the fourth switch transistor Q4, and a cathode connected to the first end of the fourth switch transistor Q4.

Considering that some types of switch transistors are provided with body diodes, any diode described in such embodiments of the present disclosure may be a body diode in a corresponding switch transistor. For example, in some specific embodiments of the present disclosure, the first switch transistor Q1, the second switch transistor Q2, the third switch transistor Q3 and the fourth switch transistor Q4 are all switch transistors provided with body diodes. Moreover, the anode of the body diode of the first switch transistor Q1 is connected to the first end of the first switch transistor Q1; the anode of the body diode of the second switch transistor Q2 is connected to the first end of the second switch transistor Q2; the anode of the body diode of the third switch transistor Q3 is connected to the second end of the third switch transistor Q3; and the anode of the body diode of the fourth switch transistor Q4 is connected to the second end of the fourth switch transistor Q4.

The types of the switch transistors in some embodiments of the present disclosure can also be selected according to needs, such as MOS transistors, IGBTs (Insulated Gate Bipolar Transistor), SiC switch transistors, GaN switch transistors, etc. For example, in the embodiment of FIG. 3, each switch transistor is an N-channel MOS transistor with a body diode, an anode of each body diode is connected to a source of the MOS transistor, and a gate of each MOS is used as a control end to be connected to the controller. In such embodiments, freewheeling is achieved by arrangement of the diodes, such that a dead time may exist during state switching, thereby ensuring the control stability of the bidirectional converter.

The controller controlling, in the flyback mode, the bidirectional converter to periodically switch between the preset first state and the preset second state is taken as an example. According to the illustration above, it can be determined that in the first state and the second state, the third switch transistor Q3 is always in a turned-off state, and the second switch transistor Q2 is always in a turned-on state.

In the first state, the controller turns off the first switch transistor Q1 and turns on the fourth switch transistor Q4, and power is supplied by the positive electrode of the load bus; in this case, the first transformer T1 stores energy, and after being switched to the second state, the controller needs to turn off the fourth switch transistor Q4, and turn on the first switch transistor Q1. It can be understood that, ideally, when switching to the second state, turning off of the fourth switch transistor Q4 and turning on of the first switch transistor Q1 occur simultaneously, but in actual applications, control error may inevitably occur. If the first switch transistor Q1 is not turned on in time when the fourth switch transistor Q4 is turned off, a situation that a voltage breaks down the first switch transistor Q1 or the second switch transistor Q2 may occur. However, if the first switch transistor Q1 is turned on before the fourth switch transistor Q4 is turned off, situations such as magnetic bias may occur on the first transformer T1. Therefore, in such embodiments, the fourth switch transistor Q4 may be turned off first, and then the first switch transistor Q1 is turned on; and a period of time from the fourth switch transistor Q4 being turned off to the first switch transistor Q1 being turned on is a dead time. During the dead time, the first diode D1 (or the body diode of the first switch transistor Q1) connected in parallel to the first switch transistor Q1, the second switch transistor Q2 and the primary winding of the first transformer T1 may form a temporary discharge loop; and after the dead time, the first switch transistor Q1 is turned on, and the power loss when the first switch transistor Q1 is powered on is less than that of the first diode D1.

In an embodiment, in the flyback mode, when the controller controls the bidirectional converter to periodically switch between the preset third state and the preset second state, dead time freewheeling is achieved by arrangement of the second diode D2.

In the forward mode, an example in which the voltage of the first wiring terminal of the network port is higher than the voltage of the second wiring terminal of the network port is taken for illustration. The controller may control the bidirectional converter to periodically switch between the preset fourth state and the preset fifth state. According to the illustration above, it can be determined that, in the fourth state and the fifth state, the first switch transistor Q1 is always in a turned-on state.

In the fourth state, the controller turns on the second switch transistor Q2 and the fourth switch transistor Q4, and turns off the third switch transistor Q3. The voltage of the first wiring terminal of the network port is higher than the voltage of the second wiring terminal of the network port, and therefore, electric energy is transmitted to the load bus from Np to Ns2 through the first transformer T1. After switching to the fifth state, the controller turns on the third switch transistor Q3, and turns off the second switch transistor Q2 and the fourth switch transistor Q4. Likewise, due to a control error, if the third switch transistor Q3 is turned on before the fourth switch transistor Q4 is turned off, the secondary side of the first transformer T1 may be short-circuited. However, if the second switch transistor Q2 and the fourth switch transistor Q4 are turned off first and then the third switch transistor Q3 is turned on, a situation that a voltage breaks down the third switch transistor Q3 or the fourth switch transistor Q4 may occur. However, in embodiments of the present disclosure, as the third diode D3 is provided, the controller may first turn off the second switch transistor Q2 and the fourth switch transistor Q4, and then turn on the third switch transistor Q3. Within the dead time, the third diode D3, the first secondary winding and a subsequent load form a discharge loop. After the dead time, the third switch transistor Q3 is turned on, and the power loss when the third switch transistor Q3 is powered on is less than that of the third diode D3.

In an embodiment, in the forward mode, the voltage of the second wiring terminal of the network port is higher than the voltage of the first wiring terminal of the network port, and dead time freewheeling is realized by the arrangement of the fourth diode D4.

In addition, it should be noted that, both the first wiring terminal of the network port and the second wiring terminal of the network port may be positive electrode power supply ends, that is, the power supply polarity is uncertain; therefore, embodiments of the present disclosure may achieve a double-ended symmetrical structure by using isolated floating drive technology. On the design of the first transformer T1, since it is necessary to consider forward and flyback, magnetic integration may be considered in a compromised way.

By applying the technical solutions provided in the embodiments of the present disclosure, the bidirectional converter is formed by the first switch transistor Q1, the second switch transistor Q2, the third switch transistor Q3, the fourth switch transistor Q4 and the first transformer T1. Under the control of the controller, the bidirectional converter may be enabled to be in a forward mode or a flyback mode, such that an Ethernet device provided with the bidirectional converter according to embodiments of the present disclosure may be used as a PSE, and may also be used as a PD. Specifically, when the bidirectional converter is in the forward mode, the bidirectional converter may receive power supplied from the network port and transmit electric energy to the load bus, such that the Ethernet device at this time may be used as a PD. Moreover, when the bidirectional converter is in the flyback mode, the bidirectional converter receives power supplied from the load bus and transmits electric energy to the network port, such that the Ethernet device at this time can be used as a PSE.

In an embodiment, when the bidirectional converter is in the forward mode, no matter which one of the first wiring terminal of the network port and the second wiring terminal of the network port is used as a positive electrode power supply end, the voltage of the positive electrode of the load bus is higher than the voltage of the negative electrode of the load bus. That is to say, in some embodiments of the present disclosure, when the Ethernet device is used as a PD, in cases where the polarity of the PSE is uncertain, the voltage of the positive electrode of the load bus is always higher than the voltage of the negative electrode of the load bus. In embodiments of the present disclosure, by controlling the bidirectional converter by the controller, the effect of determining a power supply direction by using a rectifier circuit in conventional solutions is achieved. The solutions of embodiments of the present disclosure do not require the arrangement of an additional rectifier bridge for rectification as that in the conventional solutions, thereby facilitating reduction of system space and costs.

In summary, in embodiments of the present disclosure, the bidirectional converter can enable an Ethernet device to be used not only as a PSE but also as a PD, thereby improving the use flexibility of the Ethernet device. In addition, the solutions in embodiments of the present disclosure facilitate reduction of system space and cost.

Corresponding to the described embodiments of the bidirectional converter, embodiments of the present disclosure further provide a control method for a bidirectional converter, and reference may be made to each other.

The control method may be applied to the controller in the bidirectional converter in any one of the embodiments above. The control method for a bidirectional converter includes:

the bidirectional converter is enabled to be a forward mode or a flyback mode by controlling respective on/off states of the first switch transistor, the second switch transistor, the third switch transistor and the fourth switch transistor;

wherein when the bidirectional converter is in the forward mode, the bidirectional converter receives power supplied from the network port and transmits electric energy to the load bus; when the bidirectional converter is in the flyback mode, the bidirectional converter receives power supplied from the load bus and transmits electric energy to the network port; and when the bidirectional converter is in the forward mode and any one of the first wiring terminal of the network port and the second wiring terminal of the network port is used as a positive electrode power supply end, the voltage of the positive electrode of the load bus is higher than the voltage of the negative electrode of the load bus.

In an embodiment, in response to the bidirectional converter being in the forward mode, the bidirectional converter receives power supplied from the network port and transmits electric energy to the load bus, any one of the first wiring terminal of the network port and the second wiring terminal of the network port serves as a positive electrode power supply end, and the voltage of the positive electrode of the load bus is higher than the voltage of the negative electrode of the load bus. In response to the bidirectional converter being in the flyback mode, the bidirectional converter receives power supplied from the load bus and transmits electric energy to the network port.

Corresponding to the described embodiments of the bidirectional converter and the control method therefor, embodiments of the present disclosure further provide an Ethernet device, which may include the bidirectional converter in any one of the embodiments above.

It should also be noted that, relational terms such as first and second, etc. are only used to distinguish one entity or operation from another entity or operation, and do not necessarily require or imply any actual relationship or sequence between these entities or operations. Furthermore, the terms "include", "including", or any other variations thereof are intended to cover a non-exclusive inclusion, such that a process, a method, an article, or a device that includes a series of elements not only includes those elements, but also includes other elements that are not explicitly listed, or further includes inherent elements of the process, the method, the article, or the device. Without further limitation, an element defined by a sentence "including a . . . " does not exclude other same elements existing in a process, a method, an article, or a device that includes the element.

A person skilled in the art may further appreciate that units and algorithm steps in examples described in combination with the embodiments disclosed herein can be achieved in the form of electronic hardware, computer software, or a combination of the two. To clearly describe the interchangeability between the hardware and the software, the illustration above has generally described compositions and steps of each example according to functions. Whether these functions are executed by hardware or software depends on specific applications and design constraint conditions of the technical solutions. A person skilled in the art could use different methods to implement the described functions for each particular application, but the implementation shall not be considered to go beyond the scope of some embodiments of the present disclosure.

The principle and embodiments of the present disclosure are described herein by applying specific examples, and the illustration of the embodiments above is only used to help understand the method and core ideas of embodiments of the present disclosure. It should be noted that, a person of ordinary skill in the art may further make several improvements and modifications to embodiments of the present disclosure without departing from the principle of embodiments of the present disclosure, and these improvements and modifications also belong to the scope of protection of the present disclosure.

What is claimed is:

1. A bidirectional converter, wherein the bidirectional converter is arranged in an Ethernet device, comprising:
   a first switch transistor, having a first end connected to a first wiring terminal of a network port, and a second end connected to a first end of a primary winding of a first transformer;
   a second switch transistor, having a first end connected to a second wiring terminal of the network port, and a second end connected to a second end of the primary winding of the first transformer;
   the first transformer; wherein secondary windings of the first transformer comprise a first secondary winding and a second secondary winding, a second end of the first secondary winding is connected to a first end of the second secondary winding, and a connection end therebetween is connected to a positive electrode of a load bus; and the first end of the primary winding of the first transformer, a first end of the first secondary winding and the first end of the second secondary winding are dotted terminals of each other;
   a third switch transistor, having a first end connected to the first end of the first secondary winding, and a second end respectively connected to a second end of a fourth switch transistor and a negative electrode of the load bus;
   the fourth switch transistor, having a first end connected to a second end of the second secondary winding; and
   a controller; wherein control ends of the first switch transistor, the second switch transistor, the third switch transistor and the fourth switch transistor are all connected to the controller, and the controller is configured to: enable the bidirectional converter to be in a forward mode or in a flyback mode by controlling respective on/off states of the first switch transistor, the second switch transistor, the third switch transistor and the fourth switch transistor;
   wherein the bidirectional converter is configured to: in response to being in the forward mode, receive power supplied from the network port and transmit electric energy to the load bus, and in response to being in the flyback mode, receive power supplied from the load bus and transmit electric energy to the network port;
   wherein in the forward mode, any one of the first wiring terminal of the network port and the second wiring terminal of the network port is used as a positive electrode power supply end, and a voltage of the positive electrode of the load bus is higher than a voltage of the negative electrode of the load bus,
   wherein the controller is configured to:
     in response to controlling the bidirectional converter to be in the flyback mode, control the bidirectional converter to periodically switch between a preset first state and a preset second state, or control the bidirectional converter to periodically switch between a preset third state and the preset second state;
     in response to controlling the bidirectional converter to be in the forward mode and in response to a voltage of the first wiring end of the network port being higher than a voltage of the second wiring end of the network port, control the bidirectional converter to periodically switch between a preset fourth state and a preset fifth state; and
     in response to a voltage of the second wiring terminal of the network port being higher than a voltage of the first wiring terminal of the network port, control the bidirectional converter to periodically switch between a preset sixth state and a preset seventh state;
   wherein:
     the first state is: the third switch transistor and the first switch transistor are in a turned-off state, and the fourth switch transistor and the second switch transistor are in a turned-on state;

the second state is: the third switch transistor and the fourth switch transistor are in a turned-off state, and the first switch transistor and the second switch transistor are in a turned-on state;

the third state is: the third switch transistor and the first switch transistor are in a turned-on state, and the fourth switch transistor and the second switch transistor are in a turned-off state;

the fourth state is: the first switch transistor, the second switch transistor and the fourth switch transistor are in a turned-on state, and the third switch transistor is a turned-off state;

the fifth state is: the first switch transistor and the third switch transistor are in a turned-on state, and the second switch transistor and the fourth switch transistor are in a turned-off state;

the sixth state is: the first switch transistor, the second switch transistor, and the third switch transistor are in a turned-on state, and the fourth switch transistor is in a turned-off state; and the seventh state is: the second switch transistor and the fourth switch transistor are in a turned-on state, and the first switch transistor and the third switch transistor are in a turned-off state.

2. The bidirectional converter according to claim 1, further comprising:
a first capacitor, having a first end connected to the first wiring end of the network port, and a second end connected to the second wiring end of the network port; and
a second capacitor, having a first end connected to the positive electrode of the load bus and a second end connected to the negative electrode of the load bus.

3. The bidirectional converter according to claim 1, wherein the network port is an RJ45 network port.

4. The bidirectional converter according to claim 1, wherein the first secondary winding and the second secondary winding of the first transformer have a same number of turns.

5. The bidirectional converter according to claim 1, further comprising: a display apparatus;
the controller is further configured to: in response to controlling the bidirectional converter to be in the forward mode, control the display apparatus to display first prompt information; and
in response to controlling the bidirectional converter to be in the flyback mode, control the display apparatus to display second prompt information.

6. The bidirectional converter according to claim 1, further comprising:
a first diode, having an anode connected to the first end of the first switch transistor, and a cathode connected to the second end of the first switch transistor;
a second diode, having an anode connected to the first end of the second switch transistor, and a cathode connected to the second end of the second switch transistor;
a third diode, having an anode connected to the second end of the third switch transistor, and a cathode connected to the first end of the third switch transistor; and
a fourth diode, having an anode connected to the second end of the fourth switch transistor, and a cathode connected to the first end of the fourth switch transistor.

7. The bidirectional converter according to claim 1, wherein the first switch transistor, the second switch transistor, the third switch transistor and the fourth switch transistor are all switch transistors provided with body diodes;
the anode of the body diode of the first switch transistor is connected to the first end of the first switch transistor; the anode of the body diode of the second switch transistor is connected to the first end of the second switch transistor; the anode of the body diode of the third switch transistor is connected to the second end of the third switch transistor; and the anode of the body diode of the fourth switch transistor is connected to the second end of the fourth switch transistor.

8. The bidirectional converter according to claim 7, wherein the types of the switch transistors comprise at least one of the following:
MOS transistors, IGBTs, SiC switch transistors, and GaN switch transistors.

9. A control method for a bidirectional converter, wherein the control method is applied to a controller in the bidirectional converter arranged in an Ethernet device, the bidirectional converter comprising:
a first switch transistor, having a first end connected to a first wiring terminal of a network port, and a second end connected to a first end of a primary winding of a first transformer;
a second switch transistor, having a first end connected to a second wiring terminal of the network port, and a second end connected to a second end of the primary winding of the first transformer;
the first transformer; wherein secondary windings of the first transformer comprise a first secondary winding and a second secondary winding, a second end of the first secondary winding is connected to a first end of the second secondary winding, and a connection end therebetween is connected to a positive electrode of a load bus; and the first end of the primary winding of the first transformer, a first end of the first secondary winding and the first end of the second secondary winding are dotted terminals of each other;
a third switch transistor, having a first end connected to the first end of the first secondary winding, and a second end respectively connected to a second end of a fourth switch transistor and a negative electrode of the load bus;
the fourth switch transistor, having a first end connected to a second end of the second secondary winding; and
the controller; wherein control ends of the first switch transistor, the second switch transistor, the third switch transistor and the fourth switch transistor are all connected to the controller;
wherein the control method for the bidirectional converter comprises:
enabling the bidirectional converter to be in a forward mode or in a flyback mode by controlling respective on/off states of the first switch transistor, the second switch transistor, the third switch transistor and the fourth switch transistor;
wherein in response to the bidirectional converter being in the forward mode, the bidirectional converter receives power supplied from the network port and transmits electric energy to the load bus, any one of the first wiring terminal of the network port and the second wiring terminal of the network port is used as a positive electrode power supply end, and a voltage of the positive electrode of the load bus is higher than a voltage of the negative electrode of the load bus; and in response to the bidirectional converter being in the flyback mode, the bidirectional converter receives power supplied from the load bus and transmits electric energy to the network port, wherein the controller is configured to:
in response to controlling the bidirectional converter to be in the flyback mode, control the bidirectional converter to periodically switch between a preset first state and a preset second state, or control the bidirectional converter to periodically switch between a preset third state and the preset second state;

in response to controlling the bidirectional converter to be in the forward mode and in response to a voltage of the first wiring end of the network port being higher than a voltage of the second wiring end of the network port, control the bidirectional converter to periodically switch between a preset fourth state and a preset fifth state; and in response to a voltage of the second wiring terminal of the network port being higher than a voltage of the first wiring terminal of the network port, control the bidirectional converter to periodically switch between a preset sixth state and a preset seventh state;

wherein:
the first state is: the third switch transistor and the first switch transistor are in a turned-off state, and the fourth switch transistor and the second switch transistor are in a turned-on state;

the second state is: the third switch transistor and the fourth switch transistor are in a turned-off state, and the first switch transistor and the second switch transistor are in a turned-on state;

the third state is: the third switch transistor and the first switch transistor are in a turned-on state, and the fourth switch transistor and the second switch transistor are in a turned-off state;

the fourth state is: the first switch transistor, the second switch transistor and the fourth switch transistor are in a turned-on state, and the third switch transistor is a turned-off state;

the fifth state is: the first switch transistor and the third switch transistor are in a turned-on state, and the second switch transistor and the fourth switch transistor are in a turned-off state;

the sixth state is: the first switch transistor, the second switch transistor, and the third switch transistor are in a turned-on state, and the fourth switch transistor is in a turned-off state; and the seventh state is: the second switch transistor and the fourth switch transistor are in a turned-on state, and the first switch transistor and the third switch transistor are in a turned-off state.

10. The control method for the bidirectional converter according to claim 9, further comprising:
in response to controlling the bidirectional converter to be in the forward mode, control a display apparatus to display first prompt information; and
in response to controlling the bidirectional converter to be in the flyback mode, control the display apparatus to display second prompt information.

11. An Ethernet device, comprising a bidirectional converter, wherein the bidirectional converter comprises:
a first switch transistor, having a first end connected to a first wiring terminal of a network port, and a second end connected to a first end of a primary winding of a first transformer;

a second switch transistor, having a first end connected to a second wiring terminal of the network port, and a second end connected to a second end of the primary winding of the first transformer;

the first transformer; wherein secondary windings of the first transformer comprise a first secondary winding and a second secondary winding, a second end of the first secondary winding is connected to a first end of the second secondary winding, and a connection end therebetween is connected to a positive electrode of a load bus; and the first end of the primary winding of the first transformer, a first end of the first secondary winding and the first end of the second secondary winding are dotted terminals of each other;

a third switch transistor, having a first end connected to the first end of the first secondary winding, and a second end respectively connected to a second end of a fourth switch transistor and a negative electrode of the load bus;

the fourth switch transistor, having a first end connected to a second end of the second secondary winding; and a controller; wherein control ends of the first switch transistor, the second switch transistor, the third switch transistor and the fourth switch transistor are all connected to the controller, and the controller is configured to: enable the bidirectional converter to be in a forward mode or in a flyback mode by controlling respective on/off states of the first switch transistor, the second switch transistor, the third switch transistor and the fourth switch transistor;

wherein the bidirectional converter is configured to: in response to being in the forward mode, receive power supplied from the network port and transmit electric energy to the load bus, and in response to being in the flyback mode, receive power supplied from the load bus and transmit electric energy to the network port; wherein in the forward mode, any one of the first wiring terminal of the network port and the second wiring terminal of the network port is used as a positive electrode power supply end, and a voltage of the positive electrode of the load bus is higher than a voltage of the negative electrode of the load bus, wherein the controller is configured to:
in response to controlling the bidirectional converter to be in the flyback mode, control the bidirectional converter to periodically switch between a preset first state and a preset second state, or control the bidirectional converter to periodically switch between a preset third state and the preset second state;

in response to controlling the bidirectional converter to be in the forward mode and in response to a voltage of the first wiring end of the network port being higher than a voltage of the second wiring end of the network port, control the bidirectional converter to periodically switch between a preset fourth state and a preset fifth state; and in response to a voltage of the second wiring terminal of the network port being higher than a voltage of the first wiring terminal of the network port, control the bidirectional converter to periodically switch between a preset sixth state and a preset seventh state;

wherein:
the first state is: the third switch transistor and the first switch transistor are in a turned-off state, and the fourth switch transistor and the second switch transistor are in a turned-on state;

the second state is: the third switch transistor and the fourth switch transistor are in a turned-off state, and the first switch transistor and the second switch transistor are in a turned-on state;

the third state is: the third switch transistor and the first switch transistor are in a turned-on state, and the fourth switch transistor and the second switch transistor are in a turned-off state;

the fourth state is: the first switch transistor, the second switch transistor and the fourth switch transistor are in a turned-on state, and the third switch transistor is a turned-off state;

the fifth state is: the first switch transistor and the third switch transistor are in a turned-on state, and the second switch transistor and the fourth switch transistor are in a turned-off state;

the sixth state is: the first switch transistor, the second switch transistor, and the third switch transistor are in a turned-on state, and the fourth switch transistor is in a turned-off state; and the seventh state is: the second switch transistor and the fourth switch transistor are in a turned-on state, and the first switch transistor and the third switch transistor are in a turned-off state.

12. The Ethernet device according to claim 11, wherein the bidirectional converter further comprises:
a first capacitor, having a first end connected to the first wiring end of the network port, and a second end connected to the second wiring end of the network port; and
a second capacitor, having a first end connected to the positive electrode of the load bus and a second end connected to the negative electrode of the load bus.

13. The Ethernet device according to claim 11, wherein the network port is an RJ45 network port.

14. The Ethernet device according to claim 11, wherein the first secondary winding and the second secondary winding of the first transformer have a same number of turns.

15. The Ethernet device according to claim 11, wherein the bidirectional converter further comprises:
a display apparatus;
the controller is further configured to: in response to controlling the bidirectional converter to be in the forward mode, control the display apparatus to display first prompt information; and
in response to controlling the bidirectional converter to be in the flyback mode, control the display apparatus to display second prompt information.

16. The Ethernet device according to claim 11, wherein the bidirectional converter further comprises:
a first diode, having an anode connected to the first end of the first switch transistor, and a cathode connected to the second end of the first switch transistor;
a second diode, having an anode connected to the first end of the second switch transistor, and a cathode connected to the second end of the second switch transistor;
a third diode, having an anode connected to the second end of the third switch transistor, and a cathode connected to the first end of the third switch transistor; and
a fourth diode, having an anode connected to the second end of the fourth switch transistor, and a cathode connected to the first end of the fourth switch transistor.

17. The Ethernet device according to claim 11, wherein the first switch transistor, the second switch transistor, the third switch transistor and the fourth switch transistor are all switch transistors provided with body diodes;
the anode of the body diode of the first switch transistor is connected to the first end of the first switch transistor; the anode of the body diode of the second switch transistor is connected to the first end of the second switch transistor; the anode of the body diode of the third switch transistor is connected to the second end of the third switch transistor; and the anode of the body diode of the fourth switch transistor is connected to the second end of the fourth switch transistor.

* * * * *